(12) United States Patent
Phillips

(10) Patent No.: US 6,966,702 B2
(45) Date of Patent: Nov. 22, 2005

(54) BEARING INSERT AND SERVICE TOOLS

(76) Inventor: Steve Phillips, 4222 Piper #20, Anchorage, AK (US) 99508

( * ) Notice: Subject to any disclaimer, the term of this patent is extended or adjusted under 35 U.S.C. 154(b) by 0 days.

(21) Appl. No.: 10/660,672

(22) Filed: Sep. 12, 2003

(65) Prior Publication Data

US 2005/0058379 A1    Mar. 17, 2005

(51) Int. Cl.$^7$ ............................................. F16C 43/02
(52) U.S. Cl. ....................................... 384/540; 29/255
(58) Field of Search ............................... 384/540, 539, 384/584; 29/255, 724

(56) References Cited

U.S. PATENT DOCUMENTS

| | | | |
|---|---|---|---|
| 3,807,028 A | * | 4/1974 | DeLuca ........................ 29/255 |
| 4,034,458 A | | 7/1977 | Ford et al. |
| 4,476,617 A | | 10/1984 | Kobylarz |
| 4,507,838 A | | 4/1985 | Hacker |
| 4,509,241 A | | 4/1985 | Freeland et al. |
| 5,165,169 A | | 11/1992 | Boyce |
| 5,255,435 A | | 10/1993 | Shultz |
| 6,112,411 A | | 9/2000 | Rutter |
| 6,446,328 B1 | | 9/2002 | Heflin |
| 6,539,601 B1 | | 4/2003 | Cloward |

* cited by examiner

Primary Examiner—Lenard A. Footland
(74) Attorney, Agent, or Firm—Richard C. Litman

(57) ABSTRACT

A threaded bearing insert is removably installable within a correspondingly threaded bearing housing of a machine component, rather than pressing the bearings directly into the housing as is the conventional practice. Bearings are pressed into the insert of the present invention, with the insert being threaded into the bearing housing of the machine component. Tools for the installation and removal of the insert to and from the threaded bearing housing and for supporting the insert as bearings are pressed from or into the insert, are also provided. The present bearing insert is particularly valuable in relatively complex installations such as steering and suspension knuckles in front wheel drive automobiles, which would conventionally require hours of work for removal of the knuckle for bearing removal and replacement. The present invention allows the knuckle or other machine component to remain on the machine, thus greatly reducing the time required for bearing service.

14 Claims, 4 Drawing Sheets

BEARING INSERT AND SERVICE TOOLS

BACKGROUND OF THE INVENTION

1. Field of the Invention

The present invention relates generally to ball, roller, needle, and other bearing types as used with various types of axles and shafts in various types of vehicles and other machinery. More specifically, the present invention comprises a bearing insert which threads into a threaded hub, bearing carrier, or the like. The bearings in turn are pressed or otherwise secured within the bearing insert. The present invention also includes a bearing insert installation and removal tool and a bearing press tool, configured for use with the present bearing insert.

2. Description of the Related Art

Various types of ball, roller, needle, and other bearings are used extensively in all motor vehicles and many other types of machinery, to support various axles, shafts, and other rotating components therein. Such bearings generally comprise an inner and an outer race with the bearings themselves installed therebetween, with the outer race generally being pressed into position within a hub, bearing carrier, or other component of the machine, to secure the bearing assembly in place.

Obviously, such bearings require service or replacement from time to time, due to the need for periodic lubrication and the normal wear which occurs in such rotating or spinning components. Even permanently sealed bearings must be replaced from time to time due to wear. Virtually all maintenance manuals for various machines describe the process and steps involved in the removal of bearings in various areas of the machine, for replacement or relubrication. The vast majority of cases require the bearing carrier, hub, or other component containing the bearings to be removed from the machine, so the component with the bearings pressed therein may be placed in a press in order that the old bearings may be pressed out of the bearing carrier.

An example of this is found in the suspension knuckle provided as a component of the steering and drive system of most front wheel drive motor vehicles. The removal of the bearings from the bearing housing within the knuckle requires considerable time and effort, as the knuckle component ties together a number of different suspension and steering components of the vehicle, generally including the steering tie rod, suspension arms, and brake caliper at that corner of the vehicle. Additional disassembly may be required, depending upon other components attached to the knuckle, the specific location of the bearings within the knuckle, etc. The labor involved in the removal of the knuckle can take hours, just so the knuckle assembly with its pressed in bearings may be removed from the vehicle for placement upon a press in order to press the old bearings from the knuckle assembly and reinstall new or relubricated bearings therein.

The present invention provides a solution to the above problem by means of a modification to the bearing carrier, knuckle, or other bearing housing, and a threaded bearing insert configured for installation in the modified bearing carrier. The bearing carrier is modified by threading at least a portion of the internal diameter of the bearing housing or passage therein, with the bearing carrier of the present invention being externally threaded in order to secure within the threaded bearing housing. The bearings required for the machine are pressed into the bearing insert of the present invention, before the insert is installed within the modified bearing carrier.

Thus, when bearing service or replacement is required, the mechanic need only remove components sufficient to access the bearing insert and unscrew the bearing insert for placement on a press for bearing removal therefrom. The bearing carrier (e.g., knuckle, hub, or other component) may remain in place on the vehicle or machine, thus saving considerable time, effort, and labor expense in the servicing of the bearings.

The present invention also includes a bearing insert removal and installation tool, configured to engage the threaded insert within its hub or carrier for removal therefrom or installation therein as required. A bearing press is also provided, with the press having a threaded bearing insert passage therethrough into which the bearing insert is temporarily installed for placement in a press in order to remove and install bearings in the insert.

A discussion of the related art of which the present inventor is aware, and its differences and distinctions from the present invention, is provided below.

U.S. Pat. No. 4,034,458 issued on Jul. 12, 1977 to William R. Ford et al., titled "Bearing Extracting Tool," describes a device having a series of flattened circular wedges at the distal ends of a series of threaded tension rods. The device is used by first destroying the bearing retainer normally used to provide equidistant spacing between the individual bearings in a ball, roller, or similar type of bearing assembly, in order to provide sufficient separation between individual bearings to wedge the wedges in place between the inner and outer races of the bearing. The tension rods are then retracted to pull the bearing from its seat within its housing. As can be seen by this description of the function of the Ford et al. tool, a bearing removed by this method cannot be repacked and reused. Ford et al. clearly do not anticipate any other means of installing a bearing within a housing or the like, as their tool functions only to pull such a bearing straight from its housing, rather than by unscrewing a fitting or insert from the housing.

U.S. Pat. No. 4,476,617 issued on Oct. 16, 1984 to Thomas L. Kobylarz, titled "Bearing Installation Tool," describes a generally conventional tool in which a threaded tension rod engages a corresponding concentric passage in the axle within the bearing, with the tension rod being used to force a seating tool against the bearing(s) to seat them within the housing. Again, no separately removable threaded insert is disclosed by Kobylarz.

U.S. Pat. No. 4,507,838 issued on Apr. 2, 1985 to Karl M. Hacker, titled "Tool For Removing And Replacing Wheelbearings," describes a tool operating on a radial expansion principle. The tool incorporates a collet-like assembly in which a concentric threaded rod is used to wedge the outer split sleeve of the collet outwardly so that its outwardly extending flange grips the inner edge of the bearing. The assembly may then be extracted by pulling it from the bearing housing. Hacker does not disclose or anticipate a threaded bearing insert threaded into a cooperatingly threaded bearing housing, and his tool would be inoperable in removing and installing such a threaded insert.

U.S. Pat. No. 4,509,241 issued on Apr. 9, 1985 to John A. Freeland et al., titled "Combination Bearing Removal And Installation Tool," describes a tool configured particularly for use with McPherson and Chapman type suspension struts. The device operates by extending through the bearing receiving bore of the component and presses the bearing assembly from or into the bore, depending on tool orientation and operation. Freeland et al. state that their tool may be used to remove and replace bearings without removal of the strut assembly, with its bearing passage, from the vehicle. However, use of the Freeland et al. tool still requires that any axle, spindle, or other component passing through the bearings within the housing, be removed before the threaded rod of the tool may be inserted through the center of the bearings within the housing. This additional step, while not as complex and time consuming as the removal of the entire strut assembly, nevertheless requires significantly more time and effort to accomplish than merely unscrewing a threaded bearing insert, as provided by the present invention. Freeland et al. do not disclose such a threaded bearing insert, nor is their tool operable with such a threaded insert configuration.

U.S. Pat. No. 5,165,169 issued on Nov. 24, 1992 to Rex A. Boyce, titled "Bearing Servicing Tool," describes a specialized tool for use particularly with bearings in the elevator hinge system of certain aircraft. The bearing housing with which the Boyce tool is used includes a pair of opposed inwardly disposed ears or lugs, with the Boyce tool having a complementary configuration to clear the ears or lugs. As in the case of all of the other devices discussed to this point, the Boyce tool operates by pressing the bearings from or into the housing, rather than threading or unthreading a threaded bearing insert from the housing, as in the present invention. Boyce does not anticipate or describe any form of threaded insert containing one or more bearings, which assembly may be threaded into or from the bearing housing, as provided by the present invention.

U.S. Pat. No. 5,255,435 issued on Oct. 26, 1993 to William E. Schultz, titled "Apparatus And Method For Removing Bearings," describes a tool having an axially split mandrel having an end which includes a lip for gripping the conventional bearing cone of an automatic transmission. Schultz notes that the bearing races must be removed from the cone before his tool may be used, rather than removing the entire bearing assembly from the mechanism before removing the bearings from the insert, as in the present invention. As in the cases of all of the other devices discussed to this point, the Schultz bearing cone extractor operates by applying a purely axial force to the bearing cone, and as such it is not operable with the present threaded bearing insert which requires rotation for removal and installation.

U.S. Pat. No. 6,112,411 issued on Sep. 5, 2000 to Andreas Rutter, titled "Method Of Mounting A Wheel Hub Bearing Assembly To The Knuckle Of A Vehicle Suspension Standard," describes the placement of the bearing retaining snap ring over the inwardly facing tapered flange of a hub assembly, which in turn installs within the bearing housing bore of the knuckle with the bearings captured between the cylindrical hub body and the knuckle bore. The hub, with snap ring placed thereon, is forced toward the knuckle until the snap ring is compressed by the hub taper to be pushed past the edge of the knuckle bearing bore and into its snap ring groove, to retain the bearings within the assembly. As in all of the other tools and assemblies discussed further above, the Rutter method applies purely axial force to the assembly for bearing installation. No threaded bearing insert is disclosed, nor is the Rutter bearing installation method operable with the present threaded bearing insert.

U.S. Pat. No. 6,446,328 issued on Sep. 10, 2002 to Fred Heflin, titled "Bearing Cup Installation Tool," describes a compression type tool for forcing opposed bearing assemblies into the opposite ends of a hub. The tool comprises an elongate threaded rod, placed through the bearing passage of the hub. Bearings are placed over each end of the rod, and caps installed on the rod outboard of the bearings. A nut is installed over the cap on each end of the rod, and one or both nuts are tightened to compress the caps, and the bearings captured therebetween, into the hub in the center of the assembly. The Heflin bearing installation tool places purely axial force on the bearings to press them into the hub, as in all of the other devices known to the present inventor and discussed further above. Also, Heflin indicates that the hub must be removed from the remainder of the vehicle structure for his tool to be used thereon, unlike the present invention where the vehicle structure remains intact, excepting the threaded bearing insert.

Finally, U.S. Pat. No. 6,539,601 issued on Apr. 1, 2003 to Floyd E. Cloward, titled "Bearing Press," describes a tool for the removal or installation of a sleeve bearing on a continuous shaft. Cloward provides press components formed of half collars or sleeves, which are fitted around the shaft. Compression plates formed of split blocks are also assembled around the shaft, with conventional threaded rods being used to draw up one of the plates against the split sleeve, which in turn presses the sleeve bearing from its housing. As in every one of the devices of the prior art described further above, Cloward applies a purely axial force on the bearing for removal or installation, and his device is not operable with the present threaded bearing insert which requires rotary motion for installation or removal.

None of the above inventions and patents, taken either singly or in combination, is seen to describe the instant invention as claimed. Thus a bearing insert and service tools solving the aforementioned problems are desired.

SUMMARY OF THE INVENTION

The bearing insert and service tools of the present invention serve to greatly facilitate the removal and installation of conventional ball, roller, needle, and other types of bearings from relatively complex components and assemblies in motor vehicles, various types of machinery, conveyor systems, and other environments incorporating bearings for the support of axles, shafts, and other rotating components. The present invention comprises an externally threaded bearing insert, which threads into a bearing housing having complementary internal threads. The bearings are pressed into the insert, rather than being pressed directly into the bearing housing, as is conventional. Thus, the bearings may be readily serviced merely by unthreading the bearing insert from the bearing housing, placing the insert and the bearings contained therein on a press, and pressing the bearings from the insert. The original bearings may be serviced, or new bearings provided, with the original or new bearings pressed back into the insert by means of the press. The insert, with bearings installed therein, is threaded back into the threaded bearing housing to complete the task.

The present threaded bearing insert enjoys widespread applications in a wide range of machinery, as noted further above. It is particularly beneficial when installed in the front suspension and drive system knuckles of front wheel drive automobiles and the like. The knuckle assemblies of such automobiles are relatively complex and are connected to a number of other components, e.g. suspension struts and springs, sway bars, steering linkages, and disc brake calipers. With conventional bearings, the knuckle must be removed from the vehicle for placement in a press in order to remove the bearings from the knuckle. The time and effort saved through use of the present threaded bearing insert and correspondingly threaded bearing housing is evident in view of the multiple components which must be removed in order to remove the knuckle for conventional bearing removal and replacement.

The present invention also includes tools to facilitate the removal and installation of the insert from the housing in which it has been installed, and for removal and installation of bearings within the insert. A bearing removal and installation tool comprising a cylinder with a series of peripheral fingers extending therefrom, is used to engage a mating series of slots formed in the periphery of the bearing insert. The tool includes a concentric hexagonal fitting, to which a conventional hexagonal socket and ratchet or other wrench may be connected to remove or install the insert from or into its housing. A bearing press tool is also provided, with the press tool having a threaded passage therethrough for temporary installation of the bearing insert therein. The press tool is used to support the bearing insert while the bearings are pressed therefrom or therein. The bearing insert and tools of the present invention thus serve to save considerable time and effort for the mechanic, once the bearing housing has been threaded to accept the threaded insert.

Accordingly, it is a principal object of the invention to provide a threaded bearing insert for containing bearings pressed therein, which insert may be threaded into a correspondingly threaded bearing housing in another machinery component.

It is another object of the invention to provide a bearing installation and removal tool, providing for the threaded installation and removal of the insert from the machinery component.

It is a further object of the invention to provide a bearing press tool for supporting the bearing insert after it has been removed from the machinery component, for pressing the bearings from or into the bearing insert.

Still another object of the invention is to provide a bearing insert and tools which greatly facilitate the removal and installation of bearings within various components, particularly relatively complex components such as knuckle systems in front wheel drive automobiles, with the present invention allowing the knuckle or other component to remain attached to the rest of the assembly to avoid the requirement for the removal thereof to access the bearings.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a bearing insert which may be installed within the bearing insert passage of a bearing housing structure, such as the front suspension knuckle assembly of a front wheel drive automobile or other structure incorporating bearings for the support of a rotating axle or shaft therein. The present bearing insert is quickly and easily removable from its housing, and bearings replaceable therein, by means of tools also comprising a part of the present invention. The present bearing insert and tools enable a mechanic to remove and replace bearings in a complex subassembly without removing the subassembly from the remaining mechanical structure to press the bearings therefrom, thus saving considerable time and effort in accomplishing such a task.

Figure 1:
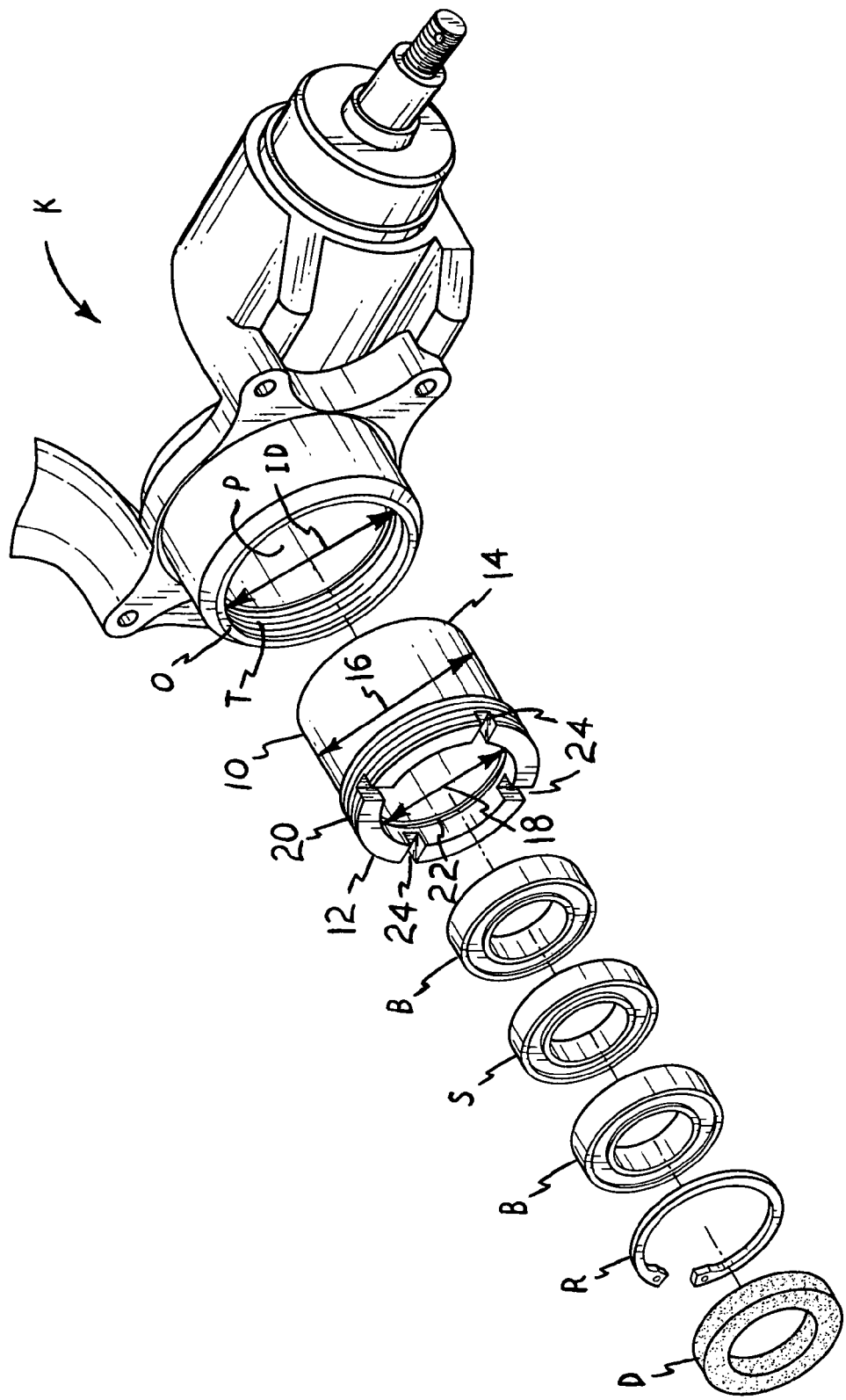
FIG. 1 is an exploded perspective view of the threaded bearing insert of the present invention and its installation with bearings and other components in a knuckle assembly.

FIG. 1 of the drawings is an exploded perspective view of a bearing assembly incorporating the present bearing insert invention. FIG. 1 illustrates a portion of an exemplary bearing housing structure, comprising a suspension knuckle assembly K for a front wheel drive automobile. Only the lower portion of the knuckle assembly K is illustrated, for clarity in the drawing Fig. The knuckle assembly K includes a bearing passage P therein for the installation of one or more bearings B and/or spacers S therein, as is conventional in such structures.

However, rather than conventionally pressing the bearings B directly into the bearing passage P, the present invention provides a cylindrical bearing insert sleeve 10 which is removably installed within the bearing passage P of the housing structure, e.g. the knuckle K. The sleeve 10 includes a first end 12, an opposite second end 14, an outer diameter 16 providing a close fit within the inner diameter ID of the knuckle bearing passage P, and an inner diameter 18 providing a press fit for the bearings B therein. The sleeve 10 also includes an externally threaded portion 20 about at least the first end portion 12 thereof, which may be in the form of a larger diameter shoulder than the outer diameter 16 of the sleeve. The threaded portion 20 may extend farther down the length of the sleeve 10 than end portion 12, if so desired.

The suspension knuckle K is modified in order to accept the bearing sleeve insert 10 of the present invention, by forming mating internal threads T adjacent the outer end O of the bearing passage P. The bearings B are first pressed into the insert 10 of the present invention and secured therein by installing a snap ring R in the internal snap ring groove 22 formed therein, with a dust seal D being installed as required. At that point, the insert 10 may be threaded into the modified bearing passage P of the knuckle assembly K and secured in place by conventional means in order to prevent rotation of the insert 10 within the bearing passage P, e.g. one or more set screws (not shown) installed in threaded radial holes (not shown) through the wall of the bearing passage P, or other means as desired. Alternatively, a second internal snap ring groove (not shown) may be formed between the internal threads T and the outer end O of the bearing passage P, and a snap ring installed after the bearing insert 10 has been seated at its proper depth within the bearing passage P of the knuckle assembly K. The insert 10 could also be safety wired in place by providing a small safety wire hole (not shown) adjacent the outer end of the bearing passage P, aligning one of the peripheral tool engagement slots 22 formed in the first end 12 of the bearing insert 10, and installing safety wire through the hole and aligned slot 22.

Preferably, the bearing insert 10 of the present invention has a relatively thin shell wall thickness. It is important to retain the maximum possible diameter for the bearings B installed within the insert 10, in order to handle the bearing loads for which the assembly was originally designed. However, it may not be desirable to enlarge the inside diameter ID of the bearing passage P to a great extent, as this would result in thinner walls and lower strength for the bearing passage structure. Accordingly, the present bearing insert 10 is formed of a tough, hard steel material in order to handle the loads applied thereto, while still providing a reasonably thin shell in order to maximize the size of the bearings B contained therein. Various alloys of tool steel or other suitable materials may be used for the construction of the present bearing insert 10.

Figure 2:
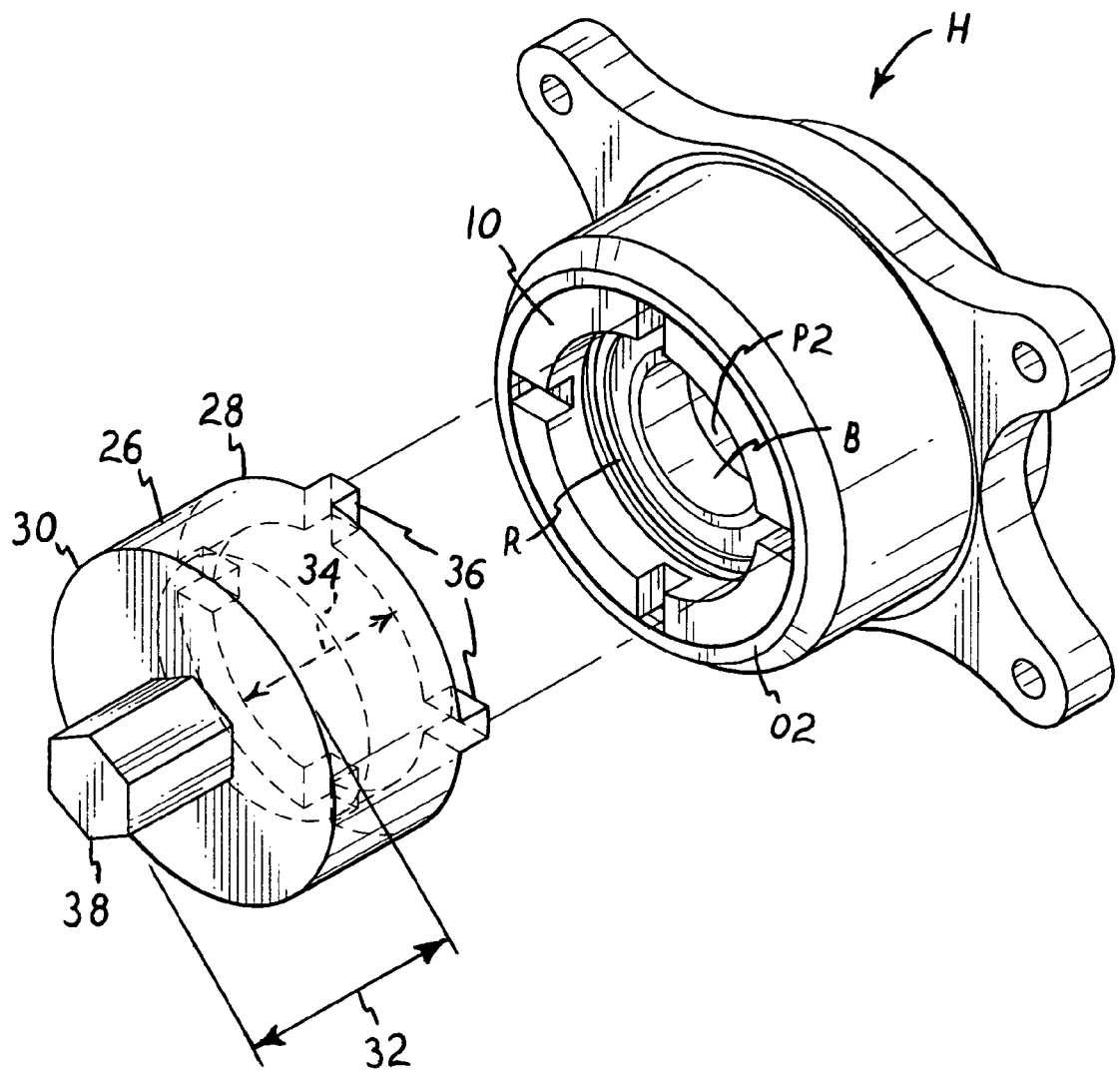
FIG. 2 is an exploded perspective view of the present bearing insert installed in a hub assembly, showing the insert installation and removal tool of the present invention therewith.

FIG. 2 of the drawings provides an illustration of an alternative installation of the present bearing insert 10, and an insert installation and removal tool 26 which may be considered to form a part of the overall invention in combination. In FIG. 2, a bearing insert 10 of the present invention is shown installed in an alternative installation, comprising a bearing hub H. The hub H conventionally has a smooth internal bore for accepting the press fit of bearings directly therein, as is the case with the conventional, unmodified suspension knuckle K illustrated in FIG. 1. However, the hub H has also been modified in the manner of the knuckle K of FIG. 1, by forming internal threads (not shown in FIG. 2, but essentially as shown in the knuckle K of FIG. 1) within the outer end O2 of the hub H. This allows the bearing insert 10, with its bearing or bearings B and bearing retaining snap ring R already installed, to be threaded into the bearing passage P2 of the hub H in the manner described further above for the knuckle assembly K of FIG. 1.

FIG. 2 also illustrates the means used to install and remove the present insert 10 from a bearing passage P2 in a hub H, knuckle K, or other bearing passage in another machine configured to accept the present bearing insert 10. The bearing insert installation and removal tool 26 of FIG. 2 has a generally cylindrical configuration with a first end 28, an opposite second end 30, an outer diameter 32 substantially equal to the outer diameter 16 (shown in FIG. 1) of the bearing insert 10, and an inner diameter 34 substantially equal to the threaded inner diameter 18 (shown in FIG. 1) of the bearing insert 10.

The first end of the tool 26 includes a plurality of bearing insert engagement fingers 36 extending peripherally and axially therefrom, with the fingers 36 being formed and configured to fit closely within the corresponding tool engagement slots 24 of the bearing insert 10. The installation and removal tool 26 is used by placing the tool fingers 36 in the slots 24 of the bearing insert 10 and rotating the tool 26 and bearing insert 10 assembly to thread the bearing insert 10 into or from the corresponding bearing passage P, P2, or other bearing insert receptacle.

The opposite second end 30 of the tool 26 may comprise a closed end, as shown, or other structure for supporting a tool fitting 38 substantially concentrically therefrom. The tool fitting 38 may have any of a number of different forms, e.g. a hexagonal shape as shown to fit within the conventional hexagonal socket of a ratchet or box end wrench, etc. Such a wrench is applied to the extension 38 and used conventionally to rotate the tool 26 to install or remove the insert 10 as desired.

Figure 3:
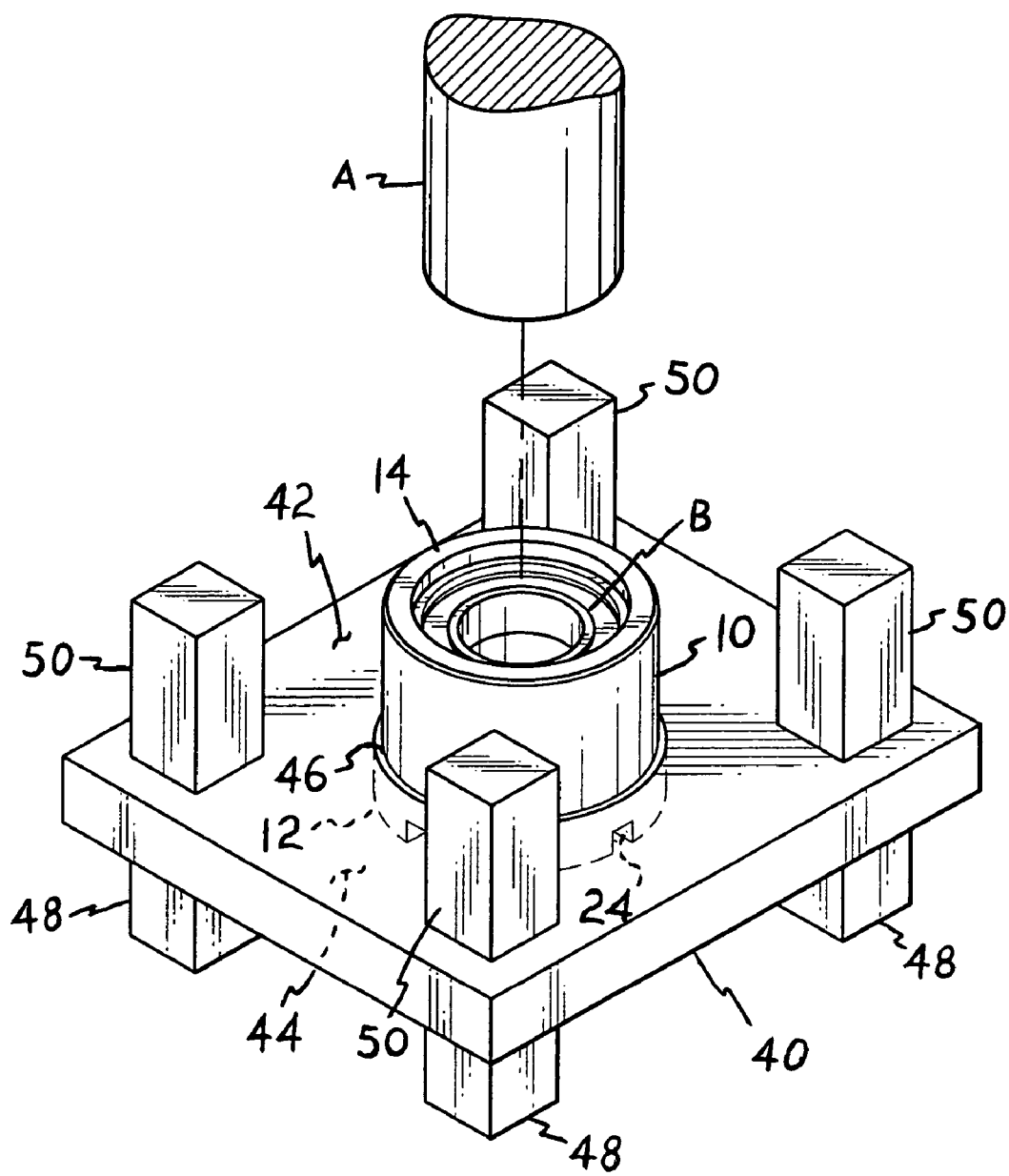
FIG. 3 is a perspective view of the present bearing insert installed in the bearing press plate of the present invention, showing the process for removal of bearings from the insert.
Figure 4:
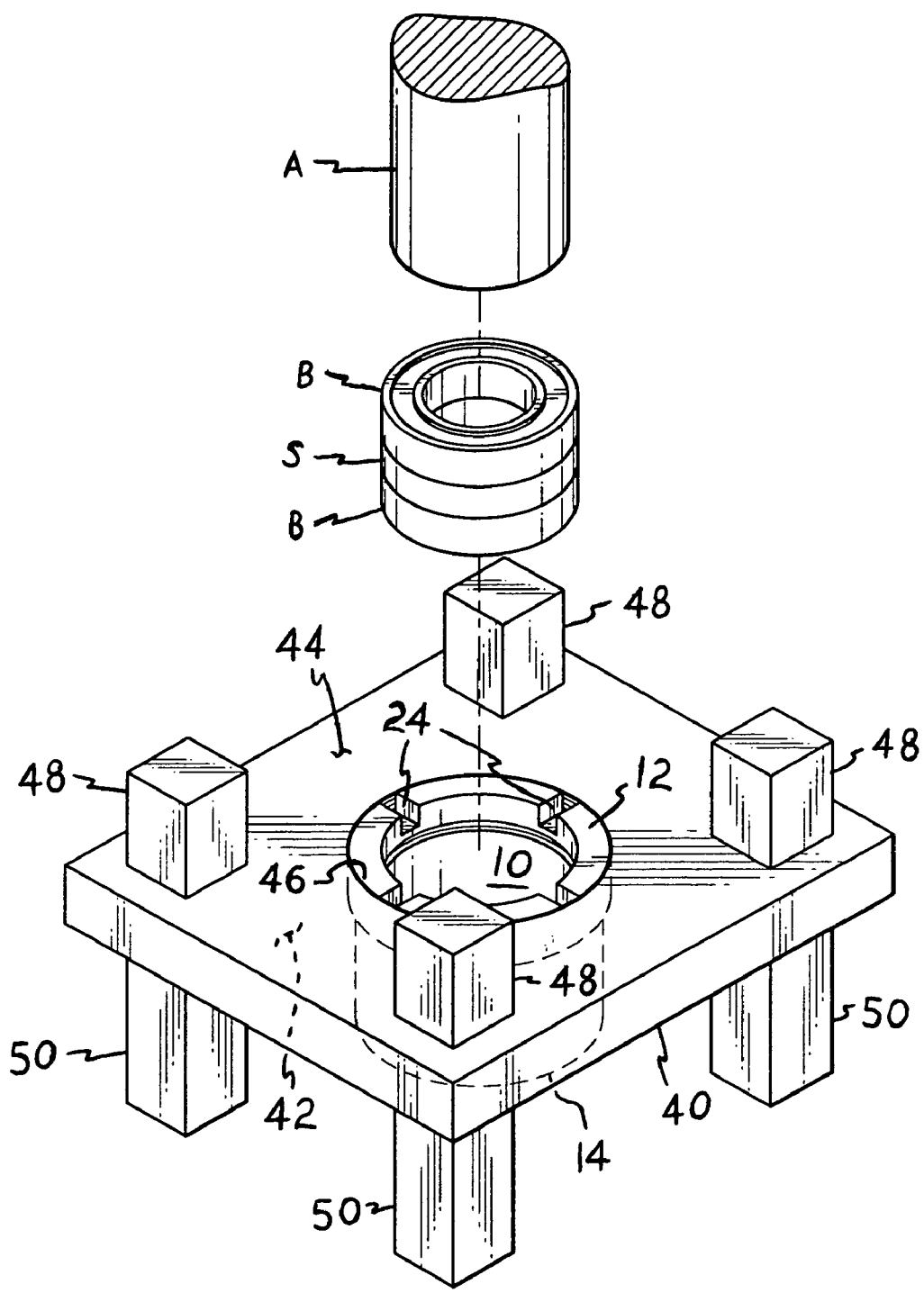
FIG. 4 is an exploded perspective view similar to FIG. 3, showing the inversion of the press plate and insert for the installation of a bearing in the insert.

FIGS. 3 and 4 illustrate a bearing press plate 40 which may be used with the present bearing insert 10, for the installation or removal of bearings B therefrom. The bearing press plate 40 is formed of a thick, rigid sheet of hard, durable material, e.g. tool steel or the like, as it must support a bearing insert 10 removably installed therein in order to press a bearing B therefrom or therein. The press plate 40 includes a first side 42, an opposite second side 44, and a threaded bearing insert passage 46 formed generally concentrically through the plate 40. The bearing insert passage 46 has a diameter and thread configuration closely fitting the externally threaded portion 20 of the bearing insert 10 of the present invention, allowing the bearing insert 10 to be hand threaded into or removed from the insert passage 46 of the of the plate 40.

The plate 40 also includes at least a first series of support legs 48 extending substantially normal to the second surface 44 thereof, with the plate 40 preferably also having a second series of support legs 50 extending substantially normal to the first surface 42 of the plate 40, opposite the first legs 48. The first series of legs 48 support the plate 40 with its second surface 44 spaced from the underlying support surface (e.g., press table, etc.), providing space between the first end 12 of the bearing insert 10 and the underlying support surface (not shown) so a bearing B pressed from the insert 10 will have room to drop from the insert 10. The opposite legs 50 space the first surface 42 and bearing insert 10 from the underlying table while a new bearing B is pressed into the insert.

The bearing press plate 40 is used by threading the bearing insert 10 into the bearing insert passage 46 from either side of the plate 40, e.g. from the first side 42, as shown in FIG. 3. The first end 12 of the insert 10 is oriented toward the second surface 44 of the plate 40 and generally flush therewith, with the unthreaded area of the insert 10 and its second end 14 extending outwardly from the first surface 42 of the plate 40. Any snap ring or other bearing retaining component securing the bearing(s) B from the first end 12 of the insert, is removed before the plate 40 and its installed bearing insert 10 are placed in the press.

The press plate 40 is then positioned in a conventional press (e.g., arbor press, or even a drill press may be used) with the bearing insert 10 and its bearing B positioned beneath an arbor A installed in the press. The second side 44 of the plate 40 is oriented toward the underlying support surface (not shown), with the space between the plate 40 and underlying surface 44 provided by the first support legs 48, providing sufficient clearance for the bearing B to clear the insert 10 when removed therefrom. The arbor A is then moved to apply pressure to the bearing B within the insert 10, pressing the bearing B from the insert 10. With the second end 14 of the insert 10 oriented toward the arbor A in the example of FIG. 3, any bearing retaining shoulder, or even a snap ring installed within the second end 14 of the insert 10, does not interfere with the passage of the bearing B, as the bearing B departs the insert 10 from its downwardly oriented first end 12.

Once the old bearing B has been removed from the insert 10, a new or repacked bearing B may be installed therein. FIG. 4 provides an exemplary illustration of such a procedure. In FIG. 4, the bearing press plate 40 has been inverted, with its first surface 42 facing downwardly and supported by the second set of legs 50. (While the first and second leg sets 48 and 50 are illustrated with unequal lengths in FIGS. 3 and 4 in order to more clearly indicate the inversion of the plate 40 between FIGS. 3 and 4, it will be understood that they may be formed to have identical lengths, if so desired, to make the support plate 40 symmetrical through the plane of the plate.) This also inverts the bearing insert 10 installed therein, with its first end 12 oriented toward the arbor A and its second end 14 oriented toward the supporting surface.

A bearing(s) B and any spacer S which may be required are positioned within the first end 12 of the insert 10, and the arbor A is used to apply pressure to seat the bearing(s) B and spacer S within the insert 10. (The bearings B and spacer S may be installed in a series of separate operations rather than sequentially; the bearings B and spacer S are shown as a group in FIG. 4 in order to avoid the necessity for a series of essentially repetitive drawings.) Once the bearing(s) B and spacer S (if required) has/have been installed, a snap ring or other bearing retaining means is installed in the insert 10, and the insert 10 is removed from the support plate 40 and reinstalled within the bearing insert passage P, P2, etc. of the mechanism from which it was removed.

In conclusion, the present bearing insert and service tools can greatly simplify the chore of removing bearings from many different mechanisms for repacking or replacement of the bearings. The present invention is particularly well suited for installation in relatively complex subassemblies having a relatively large number of attachments and connections thereto, which must be removed in order to remove the subassembly from its assembly for placement of the subassembly on a press in order to remove the bearings therefrom. The present invention requires that the subassembly be removed from its assembly only once, for removal of the bearings and threading of the bearing passage within the subassembly. The subassembly may then be reinstalled in its assembly and need never be removed again for bearing work.

The insert of the present invention, with bearings installed therein, is threaded into the newly threaded bearing passage of the subassembly and locked in place. In the event that bearing work is necessary at some time in the future, the mechanic need only remove the locking means (set screws, safety wire, etc.) holding the present insert in place within the bearing passage, and unscrew the insert from the bearing passage while leaving the subassembly and its various attachments in place on the assembly. The bearings may then be pressed from the insert using the bearing press plate of the present invention, and new or repacked bearings pressed into place as described further above. The operation may be streamlined even further if an identical insert with bearings installed therein, is at the ready when the first insert and bearings are removed from the subassembly.

The present invention is particularly well suited for use with various suspension and drive line components in various motor vehicles, particularly front wheel drive vehicles with their relatively complex suspension and front drive train knuckle subassemblies. Various all-terrain vehicles (ATVs) also make use of various types of bearings in their suspension and drive line systems, and such bearings can require a significant amount of time and effort for removal and replacement in conventional systems. The incorporation of the present bearing I insert in suspension and drive line systems of motor vehicles, shop machinery and equipment, conveyor systems, and virtually any other environment in which bearings are installed in a support mechanism, can result in a significant reduction in down time for the machine and a correspondingly significant reduction in labor time and costs for the mechanical work. The present invention will thus be appreciated by mechanics and machinery and vehicle operators alike, wherever it is installed and used.

It is to be understood that the present invention is not limited to the embodiments described above, but encompasses any and all embodiments within the scope of the following claims.

I claim:

1. A bearing insert and service tools therefor providing for the removable installation of the insert within a cooperatively threaded bearing housing, the insert and tools comprising in combination:

a cylindrical bearing insert sleeve having a first end, a second end opposite said first end, an inner diameter dimensioned for the press fit of at least one bearing therein, and an outer diameter;

an externally threaded portion disposed about at least the first end of said sleeve, the externally threaded portion having a threaded diameter greater than the outer diameter of said sleeve;

a plurality of tool engagement slots disposed peripherally about the first end of said sleeve;

a bearing insert installation and removal tool having a first end, a second end opposite the first end, an inner diameter substantially equal to the inner diameter of said bearing insert, and an outer diameter substantially equal to the threaded diameter of said bearing insert;

a plurality of bearing insert engagement fingers extending peripherally and axially from the first end of said bearing insert installation and removal tool, the fingers being dimensioned for fitting closely within the slots of said sleeve;

a bearing press plate formed of a rigid sheet of material having a first side, a second side opposite the first side, and a threaded, generally concentric bearing insert passage therethrough;

the bearing insert passage of said bearing press plate having a diameter and thread configuration for the threaded and removable installation of the externally threaded portion of said bearing insert therein; and a plurality of support legs extending from at least one of the sides of said bearing press plate, substantially normal thereto.

2. The bearing insert and service tools combination according to claim 1, wherein said bearing insert sleeve comprises a cylinder formed of steel material.

3. The bearing insert and service tools combination according to claim 1, wherein said first end of said bearing insert sleeve further includes a snap ring groove formed internally therein.

4. The bearing insert and service tools combination according to claim 1, further including a tool fitting extending concentrically from said second end of said bearing insert installation and removal tool.

5. The bearing insert and service tools combination according to claim 4, wherein said tool fitting comprises a hexagonal extension configured for fitting a conventional hexagonal wrench.

6. The bearing insert and service tools combination according to claim 1, wherein said plurality of legs of said bearing press plate further comprises a first plurality of legs extending from said first side of said plate and a second plurality of legs extending from said second side of said plate.

7. A threaded bearing insert and bearing insert housing, comprising in combination:

a cylindrical bearing insert sleeve having a first end, a second end opposite the first end, an inner diameter dimensioned for the press fit of at least one bearing therein, and an outer diameter;

an externally threaded portion disposed about at least the first end of said sleeve, the externally threaded portion having a threaded diameter greater than the outer diameter of said sleeve;

a bearing housing structure having a bearing insert passage formed therein, the bearing insert passage of said bearing housing structure having an internal diameter closely fitting the outer diameter of said bearing insert sleeve and an outer end threaded compatibly for removably receiving the externally threaded portion of said bearing insert sleeve therein; and a plurality of tool engagement slots disposed peripherally about said first end of said bearing insert sleeve.

8. The bearing insert and bearing insert housing combination according to claim 7, wherein said bearing housing structure comprises a suspension knuckle component for a front wheel drive automobile.

9. The bearing insert and bearing insert housing combination according to claim 7, wherein said bearing insert sleeve comprises a cylinder formed of hard steel material.

10. The bearing insert and bearing insert housing combination according to claim 7, wherein said first end of said bearing insert sleeve further includes a snap ring groove formed internally therein.

11. A tool assembly for removing bearings from and installing bearings into a threaded bearing insert having an inner diameter and an outer diameter having an externally threaded portion thereon, the tool assembly comprising:

a bearing insert installation and removal tool having a first end, a second end opposite the first end, an inner diameter substantially equal to the inner diameter of the bearing insert, and an outer diameter substantially equal to the outer diameter of the bearing insert;

a plurality of bearing insert engagement fingers extending peripherally and axially from the first end of said bearing insert installation and removal tool;

a bearing press plate formed of a rigid sheet of material having a first side, a second side opposite the first side, and a threaded, generally concentric bearing insert passage therethrough, the bearing insert passage having a diameter and thread configuration for the threaded and removable installation of the externally threaded portion of the bearing insert therein; and a plurality of support legs extending from at least one the sides of said bearing press plate, substantially normal thereto.

12. The tool assembly according to claim 11, further including a tool fitting extending concentrically from the second end of said bearing insert installation and removal tool.

13. The tool assembly according to claim 12, wherein said tool fitting comprises a hexagonal extension configured for fitting a conventional hexagonal wrench.

14. The tool assembly according to claim 13, wherein the plurality of legs of said bearing press plate further comprises a first plurality of legs extending from the first side of said plate and a second plurality of legs extending from the second side of said plate.

* * * * *